United States Patent
Kim (10) Patent No.: US 9,053,878 B2
(45) Date of Patent: Jun. 9, 2015

(54) MOBILE TERMINAL

(71) Applicant: LG Electronics Inc., Seoul (KR)

(72) Inventor: Jaehoon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 137 days.

(21) Appl. No.: 13/842,711

(22) Filed: Mar. 15, 2013

(65) Prior Publication Data

US 2014/0126163 A1 May 8, 2014

(30) Foreign Application Priority Data

Nov. 5, 2012 (KR) .................. 10-2012-0124068

(51) Int. Cl.
| | |
|---|---|
| *H05K 5/00* | (2006.01) |
| *H01H 13/70* | (2006.01) |
| *H04M 1/02* | (2006.01) |
| *H01H 13/48* | (2006.01) |

(52) U.S. Cl.
CPC ........... *H01H 13/7006* (2013.01); *H01H 13/48* (2013.01); *H01H 2203/038* (2013.01); *H01H 2205/034* (2013.01); *H01H 2207/004* (2013.01); *H01H 2215/004* (2013.01); *H01H 2221/05* (2013.01); *H01H 2223/04* (2013.01); *H01H 2221/016* (2013.01); *H04M 1/0274* (2013.01)

(58) Field of Classification Search
USPC ................. 361/776–778, 728–732, 752, 800
See application file for complete search history.

(56) References Cited

U.S. PATENT DOCUMENTS

| | | | | |
|---|---|---|---|---|
| 4,760,659 | A * | 8/1988 | Watabe ...................... | 40/124.02 |
| 6,148,183 | A * | 11/2000 | Higdon et al. ............. | 455/575.1 |
| 8,030,584 | B2 * | 10/2011 | Lee ............................. | 200/292 |
| 8,054,644 | B2 * | 11/2011 | Chien ......................... | 361/786 |
| 8,284,568 | B2 * | 10/2012 | Xiao ........................... | 361/810 |
| 8,604,372 | B2 * | 12/2013 | Yang et al. .................. | 200/341 |
| 2004/0240162 | A1 * | 12/2004 | Hsu et al. .................... | 361/680 |
| 2005/0272491 | A1 * | 12/2005 | Jeon ............................ | 455/575.8 |

* cited by examiner

*Primary Examiner* — Hung S Bui
(74) *Attorney, Agent, or Firm* — Birch, Stewart, Kolasch & Birch, LLP (57) ABSTRACT

There is provided a mobile terminal a case having a hollow portion provided therein, a circuit board positioned in the hollow portion of the case to mount electronic components therein, the circuit board including a securing hole, a side button having an exposed front side at a lateral side of the case, a reinforcing frame positioned between the side button and the circuit board, the reinforcing frame being coupled to a lateral portion of the circuit board by a securing hook that projects from a backside of the reinforcing frame, the securing hook being received in the securing hole and a switch module coupled to a front side of the reinforcing frame so as to be located between the reinforcing frame and the side button, the switch module being configured to generate an electric signal when the side button is pressed.

11 Claims, 6 Drawing Sheets

MOBILE TERMINAL

Pursuant to 35 U.S.C. §119(a), this application claims the benefit of earlier filing date and right of priority to Korean Application No. 10-2012-0124068, filed on Nov. 5, 2012, the contents of which are hereby incorporated by reference herein in their entirety.

BACKGROUND OF THE DISCLOSURE

1. Field of the Disclosure

The present invention relates to a mobile terminal including a side button that can be assembled easily and efficiently, with less risks of damage or breakage.

2. Discussion of the Related Art

Generally, terminals can be classified into mobile terminals and stationary terminals according to a presence or non-presence of mobility. And, the mobile terminals can be further classified into handheld terminals and vehicle mount terminals according to availability for hand-carry.

As functions of the terminal tend to be diversified, the terminal is implemented as a multimedia player type equipped with composite functions including picture or video photographing, music or video file playback, games, broadcast reception and the like for example.

Recently, a mobile terminal absorbs function of independent multimedia devices and its unique field is continuing to become more multifunctional.

As an area occupied by a display is increasing in a top side of the mobile terminal, a button type user input unit pressed by a user to generate a signal tends to be positioned in a lateral side of the mobile terminal.

Such a user input unit positioned in a lateral side, namely, a side button includes a switch module having a metal dome. A process of mounting such a conventional side button in the lateral side of the mobile terminal accompanies a problem of damage and manual works. Accordingly, work efficiency might be deteriorated and there have been demands on improving such disadvantages.

SUMMARY OF THE DISCLOSURE

Accordingly, the present invention is directed a mobile terminal and controlling method thereof that substantially obviate one or more problems due to limitations and disadvantages of the related art.

An object of the present invention is to provide a mobile terminal having an improved structure of a switch module including a side button provided therein, only to have an easy and efficient assembling process and to reduce errors or defects.

Additional advantages, objects, and features of the disclosure will be set forth in part in the description which follows and in part will become apparent to those having ordinary skill in the art upon examination of the following or may be learned from practice of the invention.

The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal includes a case having a hollow portion therein; a main circuit board positioned in the hollow portion of the case to mount electronic components therein; a side button exposed a front side via a lateral side of the case; a reinforcing frame positioned behind the side button, to be coupled to a lateral portion of the main circuit board perpendicularly; and a switch module coupled to a front side of the reinforcing frame, to generate an electric signal when the side button is pressed, wherein the main circuit board comprises a securing hole formed therein, and the reinforcing frame comprises a securing hook projected toward the back side to be inserted in the securing hole.

The switch module may include an injection mold comprising a metal pattern; a metal dome coupled to a front side of the injection mold to generate and transmit an electric signal to the metal pattern; and a terminal connected to the metal pattern to output the electric signal.

The terminal may be bent toward the back side of the reinforcing frame, to be connected to a circuit pattern of the main circuit board in a soldering method.

The switch module may include a flexible substrate coupled to a front side of the reinforcing substrate; and a metal dome coupled to a front side of the flexible substrate to generate an electric signal when the side button is pressed, and the flexible substrate may be partially connected to the circuit pattern of the main circuit board to transmit the electric signal.

An end of the securing hook inserted in the securing hole may be fixed to the main circuit board in a soldering method.

Two or more securing hooks may be provided.

The securing hook may be extended from an upper end of the reinforcing frame toward the back side, with being bent in a "$\neg$" shape.

The switch module and the reinforcing frame may be integrally formed with each other.

The switch module and the reinforcing frame may be coupled to the main circuit board in Surface Mount Technology (SMT) process for the main circuit board.

Accordingly, the present invention provides the following effects and/or advantages.

According to at least one embodiment of the present invention, the switch module may be assembled during the process of fabricating the main circuit board to reduce manual works and overall fabrication processes. Furthermore, a process of inserting the switch module between the case and the frame may be omitted to prevent damage or breakage generated in the assembling process.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings.

DESCRIPTION OF SPECIFIC EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators.

However, by way of non-limiting example only, further description will be with regard to a mobile terminal 100, and it should be noted that such teachings may apply equally to other types of terminals.

Figure 1:
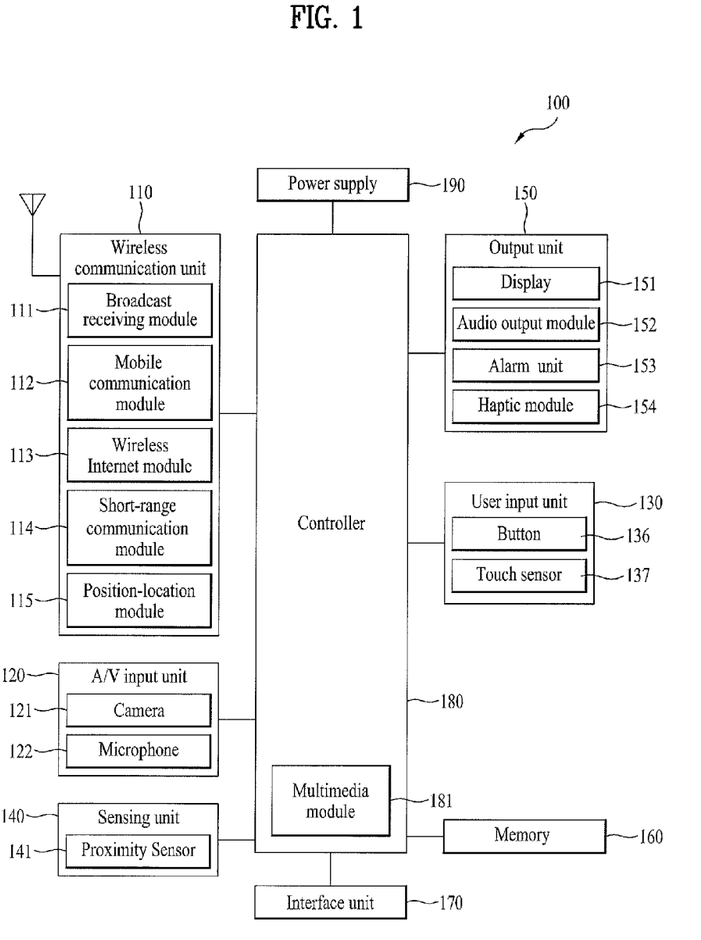
FIG. 1 is a block diagram of a mobile terminal according to one embodiment of the present invention.

FIG. 1 is a block diagram of a mobile terminal 100 in accordance with an embodiment of the present invention.

FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

The wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal.

The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By non-limiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Meanwhile, the A/V (audio/video) input unit 120 is configured to input an audio signal or a video signal and can include a camera module 121, a microphone module 122 and the like. The camera module 121 processes an image frame of a still or moving picture obtained by an image sensor in a video call mode or a photographing mode. And, the processed image frame can be displayed on the display 151.

The image frame processed by the camera module 121 is stored in the memory 160 or can be externally transmitted via the wireless communication unit 110. At least two camera modules 121 can be provided according to a configuration type of the terminal.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. This input data can include input data for on-off operation control of a light-transmitting display 150 and a selective transmission member 155/155' explained later.

Examples of such devices include a keypad, a dome switch, a touchpad (e.g., static pressure/capacitance), a jog wheel, a jog switch, etc.

The sensing unit 140 detects such a current configuration of the mobile terminal 100 as an open/closed configuration of the mobile terminal 100, a location of the mobile terminal 100, a presence or non-presence of user contact and the like and then generates a sensing signal for controlling an operation of the mobile terminal 100.

For instance, if the mobile terminal 100 is a slide phone type, the sensing unit 140 is able to sense whether a slide phone is open or closed. And, the sensing unit 140 is responsible for sensing functions related to a presence or non-presence of power supply of the power supply 190, an external device loading of the interface unit 170 and the like.

Meanwhile, the sensing unit 140 can include a proximity sensor 141.

The output unit 150 is configured to output an audio signal, a video signal and/or an alarm signal. And, the output unit 150 can include the display 151, an audio output module 152, an alarm output module 153, a haptic module 154, a selective cutoff member 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call.

The display 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the displays can have a transparent or light-transmitting configuration to be externally viewable therethrough. And, such a display can be called a light-transmitting display. TOLED (transparent OLED), AMOLED (active matrix OLED) and the like are representative examples of the light-transmitting displays. And, a rear structure of the display can have the light-transmitting configuration as well. Owing to theses configurations, a user is able to project light toward a rear side of the light-transmitting display via an area occupied by a display of a terminal body.

A mobile terminal according to one embodiment of the present invention can include the above-configured light-transmitting display 151. This shall be described in detail later.

According to an implementation type of the mobile terminal 100, at least two displays 151 can exist in the mobile terminal 100. For instance, a plurality of displays can be arranged on one face of the mobile terminal 100 in a manner of being spaced apart from each other or being built in one body. For another instance, a plurality of displays can be arranged on different faces of the mobile terminal 100, respectively.

In case that the display 151 and a sensor for detecting a touch action (hereinafter called 'touch sensor') of such a pointer as a user's finger, a pen and the like configures a mutual layer structure (hereinafter called 'touchscreen'), it is able to use the display 151 as an input device as well as an output device. In this case, the touch sensor can be configured with a touch film, a touch sheet, a touchpad or the like for example.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know which portion of the display 151 is touched.

A proximity sensor 141 can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving ode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

Moreover, the output unit 150 can further include a selective transmission member controlled by the controller 180. In this case, the selective transmission member 155 means the member enables light to be transmitted or reflected in accordance with whether a power is applied or not. This shall be explained later.

The memory 160 can store programs for the processing and control of the controller 180 and is also able to perform a function for temporary storage of inputted/outputted data (e.g., phonebook data, message data, still picture data, moving picture data, etc.). Moreover, the memory 160 can store data of various patterns of vibration and sound outputted in case of the touch input to the touchscreen.

The memory 160 can include at least one storage medium of such a type as a flash memory type, a hard disk type, a multimedia card micro type, a card type memory (e.g., SD memory, XD memory, etc.), RAM and ROM. Moreover, the mobile terminal 100 is able to operate a web storage that performs a storage function of the memory 160 on internet.

The interface unit 170 plays a role as an interface with every external device connected to the mobile terminal 100. For instance, the external devices include a wire/wireless headset, an external electricity charger, a wire/wireless data port, a card socket (e.g., memory card socket, SIM/UIM card socket, etc.), audio I/O (input/output) terminals, video I/O (input/output) terminals, earphones, etc. The interface unit 170 receives data from the external device or is supplied with power. The interface unit 170 then delivers the received data or the supplied power to the corresponding component within the mobile terminal 100 or transmits data within the portable terminal 100 to the corresponding external device.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 100 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 normally controls overall operations of the mobile terminal 100. For instance, the controller 180 performs the control and processing related to speech call, data communication, video call and the like. And, the controller 180 can be provided with a multimedia play module 181 for multimedia playback as well. The multimedia playback module 180 can be configured as hardware within the controller 180 or software separate from the controller 180.

The controller 180 is able to perform a pattern recognizing processing for recognizing a handwriting input or a drawing input performed on the touchscreen into a character and an image, respectively.

And, the controller 180 is able to control the on-off operations of the display 151 and the selective transmission member 155.

The power supply 190 receives an external and/or internal power source and then supplies power required for operations of the respective components, under the control of the controller 180.

A battery may include a built-in rechargeable battery and may be detachably attached to the terminal body for a charging and the like. A connecting port may be configured as one example of the interface 170 via which an external charger for supplying a power of a battery charging is electrically connected.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in the memory 160, and executed by the controller 180.

Figure 2:
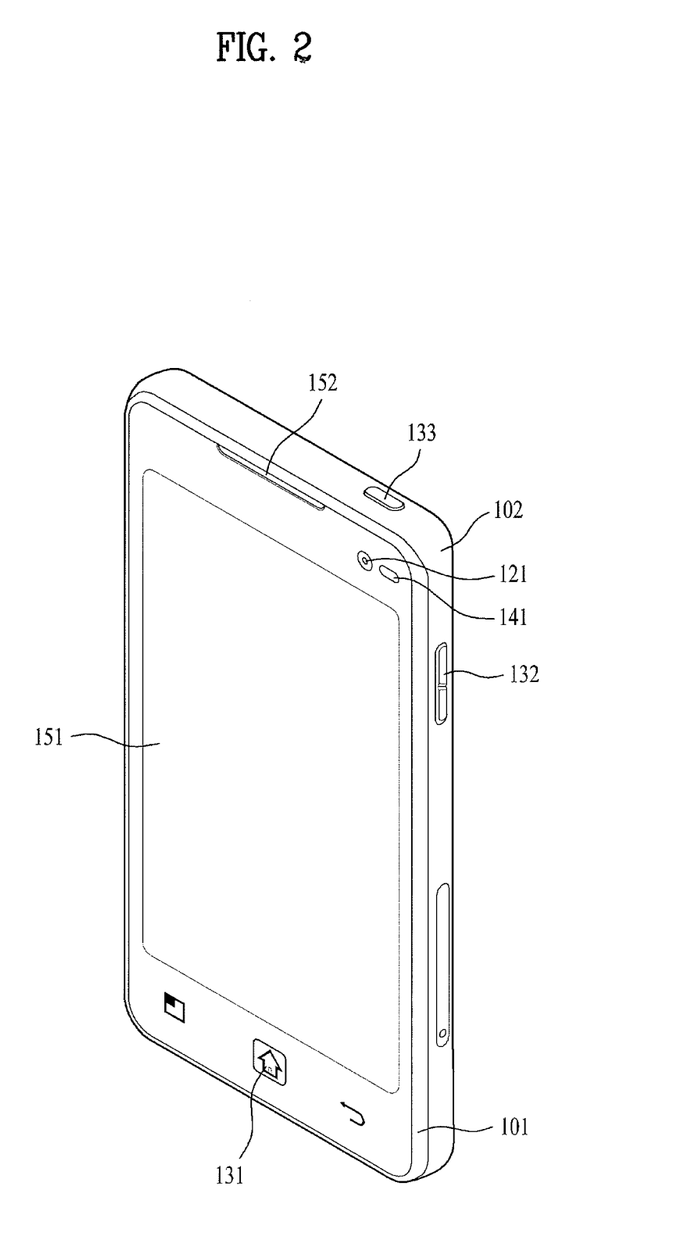
FIG. 2 is a perspective view of a front side provided in the mobile terminal according to one embodiment of the present invention.

FIG. 2 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2, the mobile terminal 100 includes a housing configuring an exterior thereof. In the present embodiment, the housing can be divided into a front housing 101 and a rear housing 102. Various electric/electronic parts are loaded in a space provided between the front and rear housings 101 and 102. Optionally, at least one middle housing can be further provided between the front and rear housings 101 and 102 in addition.

The housings 101 and 102 are formed by injection molding of synthetic resin or can be formed of metal substance such as stainless steel (STS), titanium (Ti) or the like for example.

In particular, each of the housings 101 and 102 can include a light-transmitting (transmittive) housing capable of transmitting light. For instance, the front housing 101 and /or the rear housing 102 is formed by injection molding of transparent synthetic resin. In this case, since intensity of incident light supplied to the solar cell module 193/193' provided to the housing 101/102 increases, it is advantageous in that a charging process can be performed more quickly.

A display 151, an audio output unit 152, a camera 121, user input units 130/131 and 132, a microphone 122, an interface 180 and the like can be provided to the terminal body, and more particularly, to the front housing 101.

The display 151 occupies most of a main face of the front housing 101. The audio output unit 151 and the camera 121 are provided to an area adjacent to one of both end portions of the display 151, while the first user input unit 131 and the microphone 122 are provided to another area adjacent to the other end portion of the display 151. The second user input unit 132 and the interface 170 can be provided to lateral sides of the front and rear housings 101 and 102.

The user input unit 130 is manipulated to receive a command for controlling an operation of the terminal 100. And, the input unit 130 is able to include a plurality of user input units 131 and 132. The user input units 131 and 132 can be generally named a manipulating portion and may adopt any mechanism of a tactile manner that enables a user to perform a manipulation action by experiencing a tactile feeling.

Content inputted by the first and second user input units 131 and 132 can be diversely set. For instance, such a command as start, end, scroll and the like is inputted to the first user input unit 131. And, a command for a volume adjustment of sound outputted from the audio output unit 152, a command for a switching to a touch recognizing mode of the display 151 or the like can be inputted to the second user input unit 132.

Such the user input units 131, 132 and 133 may be button types configured to recognize a signal when receiving a pressure applied by the user. Optionally, they may include a touch sensor 137 and receive a user's command inputted only by the user's touch, rather than the display 151.

Figure 3:
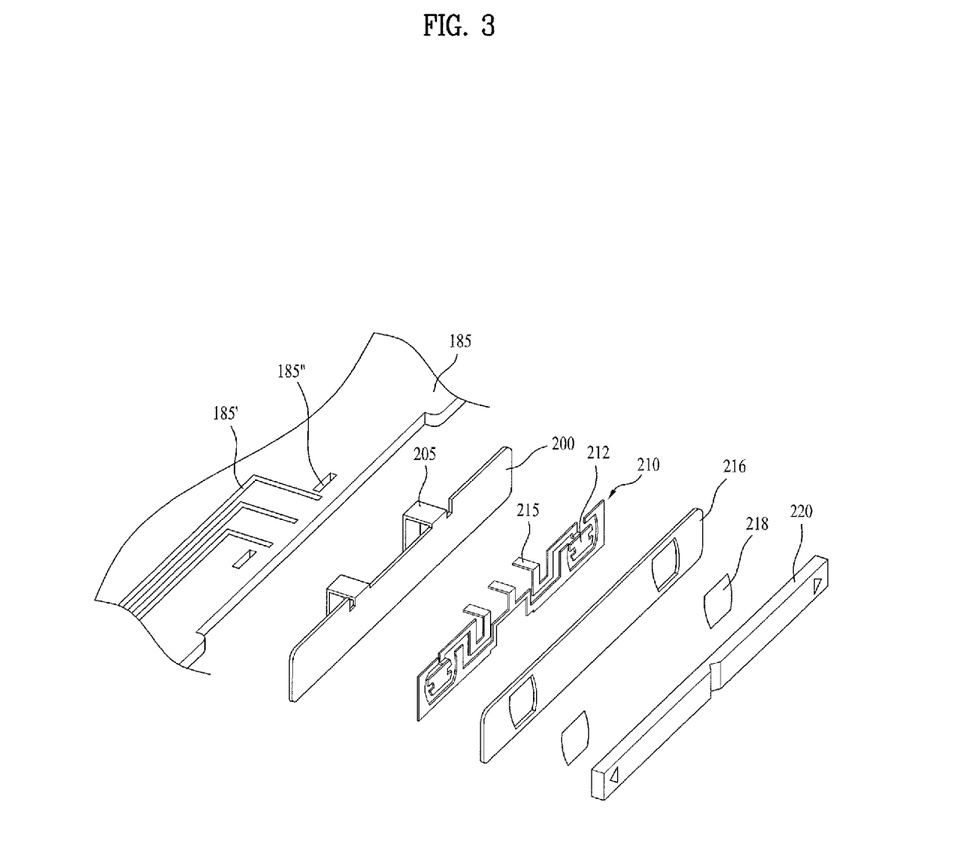
FIG. 3 is an exploded perspective view illustrating a main circuit board, a reinforcing frame and a switch module according to one embodiment of the present invention.

FIG. 3 is an exploded perspective view illustrating the user input unit 132 positioned in a lateral side of the mobile terminal case 101 according to one embodiment of the present invention. Referring to FIG. 3, there are shown a main circuit board 185, a side button 220, a reinforcing frame 200 and a switch module 210.

The side button 220 is mounted to a lateral side the case 101 and 102, being exposed outside. As shown in FIG. 3, a side button having two pressed portions or a side button having one pressed portion may be included in the present invention.

The main circuit board 185 is an element configured to implement main control of the mobile terminal and electronic components are mounted on the main circuit board 185. The main circuit board 185 may receive signals or data from the camera module 121, the microphone module 122 and the touch sensor 137 and it may control the display 151 and the audio module 152. The signal generated by the user's pressing of the user input unit 132 may be transmitted to the main circuit board and the main circuit board may implement a function corresponding to the signal.

A circuit pattern 185' may be formed on the main circuit board 185 and connect the user input unit 132 with a predetermined part of the circuit pattern 185' to transmit a signal. While the main circuit board 185 is arranged toward the front side of the case, the switch module 210 generated the signal of the user input unit 132 is arranged toward the lateral side and it is arranged perpendicular to the main circuit board 185 accordingly.

It is difficult to couple the main circuit board 185 and the switch module 210 to each other, because they are arranged perpendicularly. In a conventional mobile terminal, a lateral wall is provided in a bracket supporting the display 151 or the main circuit board 185 and such a lateral wall supports a switch module 210 configured of a flexible substrate 230.

Especially, a flexible substrate is used as a conventional switch module 210 and such the conventional switch module requires a structure for supporting a back side of the flexible substrate having a weak rigidity. The bracket supports a device mounted in the mobile terminal and it has to be thick. Accordingly, the lateral wall formed in the bracket to support the switch module 210 results in enlarging the lateral direction volume of the mobile terminal unnecessarily.

The switch module 210 may generates an electric signal when the side button 220 is pressed. Such the switch module 210 includes a metal dome 218 having a deformable shape when being pressed and a metal pattern 212 configured to generate and transmit a signal to the main circuit board when the shape of the metal dome 218 is deformed.

Here, the rigidity of the flexible substrate is weak, which requires a structure for supporting a back side of the flexible substrate. Accordingly, the lateral wall is formed in the bracket supporting the display 151 or the main circuit board 185 and it supports the switch module 210 configured of the flexible substrate 230. The bracket is employed to support the devices mounted in the mobile terminal and it is relatively thick. Accordingly, the lateral wall formed in the bracket might enlarge the lateral direction volume of the mobile terminal unnecessarily.

Moreover, in the conventional mobile terminal, the bracket, the main circuit board 185, the side button 220 and the like are assembled to the case of the mobile terminal. After that, the switch module 210 is inserted between the lateral wall of the bracket and the side button 220. That process is performed manually and that is one of reasons heightening the fabrication cost, with risks of assembly line errors. There might be damage to the flexible substrate because the flexible substrate is inserted in a narrow space during the assembling process.

The mobile terminal according to the present invention in the specification uses the reinforcing frame 200 as a supporting structure coupled to the main circuit board 185, instead of the lateral wall of the bracket. The reinforcing frame 200 is perpendicularly coupled to a lateral side of the main circuit board 185. The reinforcing frame 200 includes a securing hook 205 projected toward the back side to be coupled to the main circuit board 185.

It is preferred that two or more securing hooks are provided to be coupled to the main circuit board 185 stably. Also, the securing hook 205 is bent toward the back side in a "⌐" shape to be coupled to the main circuit board 185 perpendicularly in one plate and it may be inserted in a securing hole 185" after that.

The main circuit board 185 has the securing hole 185" formed therein to securely insert the securing hook 205 therein. Once the securing hook 205 is inserted in the securing hole 185", the reinforcing frame 200 can be coupled to the main circuit board 185 perpendicularly.

The securing process between the securing hook 205 and the securing hole 185" may be enabled by Surface Mounding Technology (SMT) configured to mount various electronic components in the main circuit board 185. Accordingly, the conventional manual process of coupling the switch module 210 may be omitted and an error rate can be reduced. Also, the process cost can be reduced.

Figure 4:
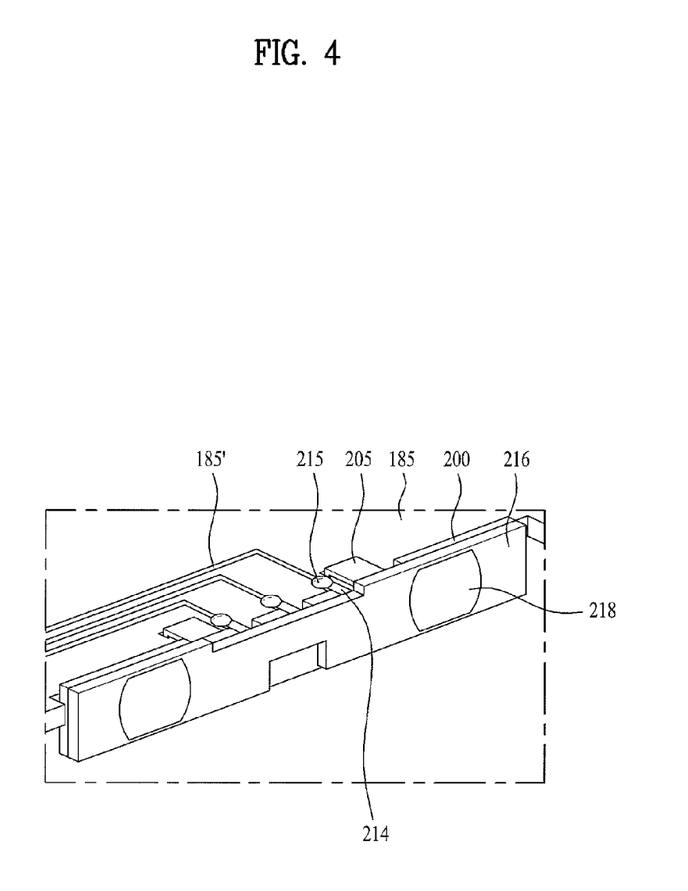
FIG. 4 is a perspective view of coupling among the main circuit, the reinforcing frame and the switch module shown in FIG. 3.
Figure 5:
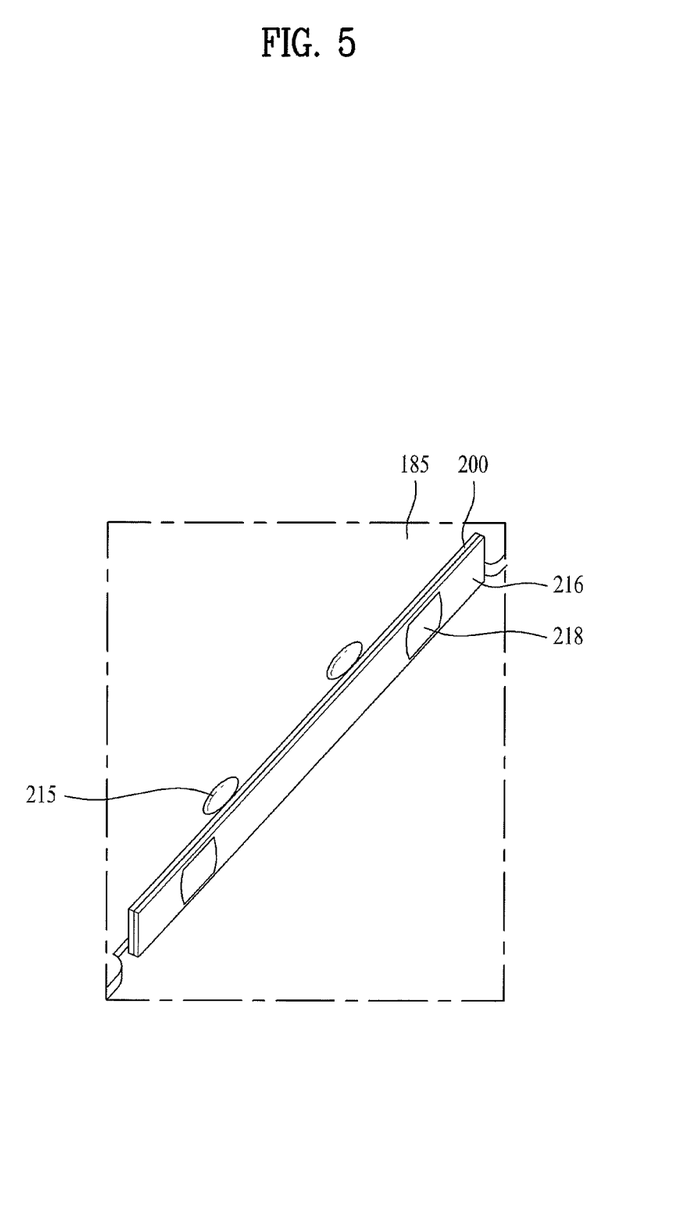
FIG. 5 is a perspective view of the main circuit board, the reinforcing frame and the switch module shown in FIG. 4, seen from below.

The switch module 210 is arranged on a front side of the reinforcing frame 200. The embodiment of the present invention shown in FIGS. 3 to 5 provides the switch module 210 integrally formed with the reinforcing frame 200. The switch module 210 according to this embodiment includes a metal pattern 212, a metal dome 218 and a terminal 214 configured to connect the metal pattern 212 to the main circuit board 185. The switch module 210 may further include an injection mold 216 for fixing and protecting the metal pattern 212.

The metal pattern 212 is arranged on a front side of the reinforcing frame 200 and the terminal 214 positioned in an end of the metal pattern 212 is connected to the circuit pattern 185' of the main circuit board 185 to transmit the generated electric signal. The terminal 214 is bent toward a back side of the reinforcing frame 200 to be connected to the circuit pattern 185' of the main circuit board 185 in a soldering method as shown in FIG. 4. In the Surface Mounting Technology (SMT) process mentioned above, the reinforcing frame 200 is connected to the main circuit board 185 and the soldering process of the terminal 214 is performed.

The other end of the metal pattern 212 is positioned in a back side of the metal dome 218. When the metal dome 218 is pressed, the electrical connection between the metal dome 218 and the metal pattern 212 is changed to generate an electric signal.

As mentioned above, synthetic resin is injection-molded to fix the metal pattern 212. A predetermined portion connected with the terminal 214 and a predetermined portion connected with the main circuit board 185 are exposed outside. The metal pattern 212 and the injection mold 216 may be integrally formed in the reinforcing frame 200 with each other directly. Optionally, the metal pattern 212 and the injection mold 216 may be fabricated independently and they may be attached to the reinforcing frame 200.

The metal dome 218 is formed of a metallic material with a dome shape. As a center portion of the metal dome 218 is pressed, the shape of the metal dome 218 may be deformed. An actuator (not shown) may be disposed between a top side of the metal dome 218 and a back side of the side button 220 to press the top surface of the metal dome when the side button 220 is pressed.

FIG. 4 is a perspective view illustrating that the reinforcing frame 200 and the switch module 210 are assembled to the main circuit 185. FIG. 5 is a diagram of FIG. 4, seen from below. The securing hook of the reinforcing frame 200 is inserted in the securing hole 185" of the main circuit board 185. As shown in FIG. 5, an end of the securing hook 205 may be soldered in a back side of the main circuit board 185. The soldering 215 is performed to connect the terminal 214 and the circuit pattern 185' of the main circuit board 185 with each other and then the reinforcing frame 200 and the switch module 210 are assembled to the main circuit board 185.

Figure 6:
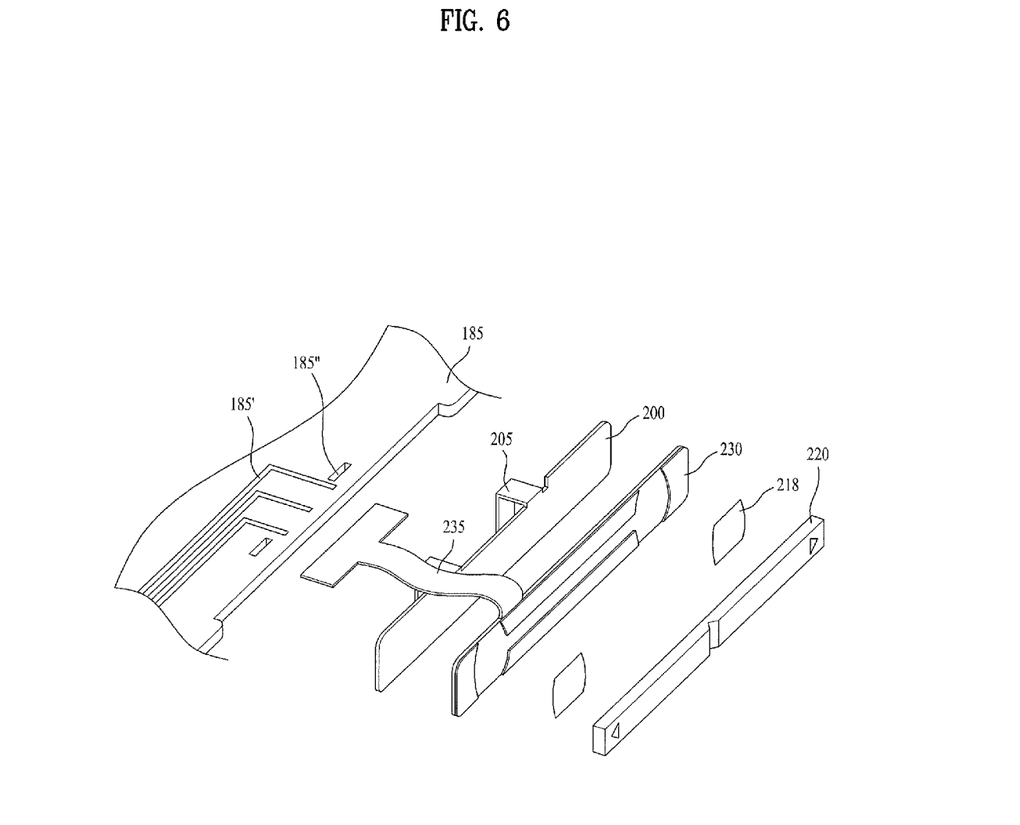
FIG. 6 is an exploded perspective view of a main circuit board, a reinforcing frame and a switch module according to another embodiment of the present invention.

FIG. 6 is an exploded perspective view illustrating a reinforcing frame 200 and a switch module 210 according to another embodiment of the present invention. In this embodiment, a flexible substrate 230 is used as the switch module. Similar to the embodiment described above, the switch module 210 configured of the flexible substrate 230 is coupled to a reinforcing frame 200 having a securing hook 205 and it supports a back side of the flexible substrate 230. After that, the flexible substrate 230 may be connected to the main circuit board 185 in Surface Mounding Technology (SMT).

A predetermined portion of the flexible substrate 230 is electrically connected to the circuit pattern 185' of the main circuit board 185, to be employed as the terminal 214 mentioned in the above embodiment. Even in this embodiment, the reinforcing frame 200 supporting the flexible substrate 230 is perpendicularly coupled to the main circuit board 185 in Surface Mounting Technology (SMT) process. Accordingly, the working cost can be reduced and errors generated by the manual work can be reduced.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
a case having a hollow portion provided therein;
a circuit board positioned in the hollow portion of the case to mount electronic components therein, the circuit board including a securing hole;
a side button having an exposed front side at a lateral portion of the case;
a reinforcing frame positioned between the side button and the circuit board, the reinforcing frame being coupled to the lateral portion of the circuit board by a securing hook that projects from a back side of the reinforcing frame, the securing hook being received in the securing hole; and
a switch module coupled to a front side of the reinforcing frame so as to be located between the reinforcing frame and the side button, the switch module being configured to generate an electric signal when the side button is pressed.

2. The mobile terminal according to claim 1, wherein the switch module includes:
an injection mold having a metal pattern;
a metal dome coupled to a front side of the injection mold to transmit an input from the side button to the metal pattern; and
a terminal connected to the metal pattern to output the electric signal.

3. The mobile terminal according to claim 2, wherein the terminal is bent toward the back side of the reinforcing frame and is connected to a circuit pattern of the circuit board by soldering.

4. The mobile terminal according to claim 1, wherein the switch module includes:
a flexible substrate coupled to the front side of the reinforcing frame; and
a metal dome coupled to a front side of the flexible substrate to transmit and input the electric signal when the side button is pressed, and
wherein the flexible substrate is connected to the circuit pattern of the main circuit board to transmit the electric signal.

5. The mobile terminal according to claim 1, wherein an end of the securing hook inserted in the securing hole is fixed to the circuit board by soldering.

6. The mobile terminal according to claim 1, wherein the securing hook includes at least two securing hooks.

7. The mobile terminal according to claim 6, wherein the securing hole includes at least two securing holes and each of the securing hooks is received in a corresponding securing hole.

8. The mobile terminal according to claim 1, wherein the securing hook extends from an upper end of the reinforcing frame and is bent in a "⊓" shape.

9. The mobile terminal according to claim 1, wherein the switch module and the reinforcing frame are integrally formed.

10. The mobile terminal according to claim 1, wherein the switch module and the reinforcing frame are coupled to the circuit board using a Surface Mount Technology (SMT) process.

11. The mobile terminal according to claim 1, wherein the circuit board is a main circuit board.

\* \* \* \* \*